United States Patent [19]
Stapleford et al.

[11] 3,853,683
[45] Dec. 10, 1974

[54] ROOFING BOARD OF FIBROUS GLASS

[75] Inventors: Stuart H. Stapleford, Atlanta, Ga.;
Charles E. Nutter, Hebron, Ohio

[73] Assignee: Owens-Corning Fiberglas Corporation, Toledo, Ohio

[22] Filed: Apr. 1, 1969

[21] Appl. No.: 812,170

[52] U.S. Cl. ............... 161/141, 161/170, 161/202, 161/236, 161/DIG. 4, 260/28.5 AS, 260/28.5 AS
[51] Int. Cl. ............................................. B32b 3/00
[58] Field of Search ....... 161/72, 93, 151, 202, 141, 161/140, 236, 166; 52/309

[56] References Cited
UNITED STATES PATENTS

| | | | |
|---|---|---|---|
| 2,159,586 | 5/1939 | Greider et al. | 161/236 UX |
| 2,523,759 | 9/1950 | Grant | 161/DIG. 4 |
| 2,597,996 | 5/1952 | Johnson | 161/236 X |
| 2,734,882 | 2/1956 | Kirsch | 260/28.5 AS |
| 2,918,940 | 12/1959 | Carr | 260/28.5 AS |
| 2,976,256 | 3/1961 | Whittier et al. | 161/236 X |
| 3,044,146 | 7/1962 | Thomas et al. | 161/72 X |
| 3,066,061 | 11/1962 | Winslow | 161/236 X |
| 3,193,439 | 7/1965 | Price et al. | 161/93 |
| 3,336,179 | 8/1967 | Campbell et al. | 161/72 |
| 3,369,956 | 2/1968 | Schuetz et al. | 161/236 X |
| 3,385,749 | 5/1968 | Hampshire | 161/166 X |
| 3,402,095 | 9/1968 | Varfeldt et al. | 161/236 X |

*Primary Examiner*—George F. Lesmes
*Assistant Examiner*—Paul J. Thibodeau
*Attorney, Agent, or Firm*—Carl G. Staelin; John W. Overman; William P. Carr

[57] ABSTRACT

A generally air permeated, thermal insulating roofing board of bonded, randomly and spacedly positioned individual, discontinuous glass fibers, short bundles or strands of glass fibers uniformly distributed in intermixed and bonded relation with the individual glass fibers throughout a comparatively narrow stratum of the board adjoining one planar surface thereof, said stratum being saturated with asphalt, and a comparatively stiff and solid surfacing sheet of asphaltic and polymeric materials reinforced with fibrous glass secured to the roofing board over the narrow stratum thereof.

5 Claims, 12 Drawing Figures

INVENTORS
STUART H. STAPLEFORD &
BY CHARLES E. NUTTER

Staelin & Overman
ATTORNEYS

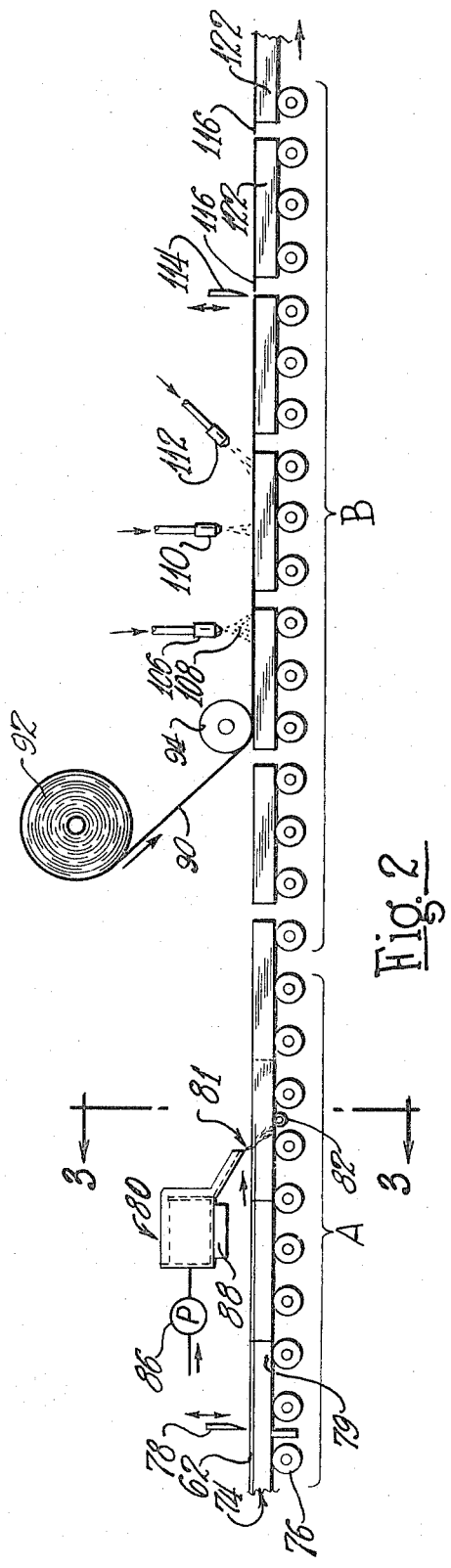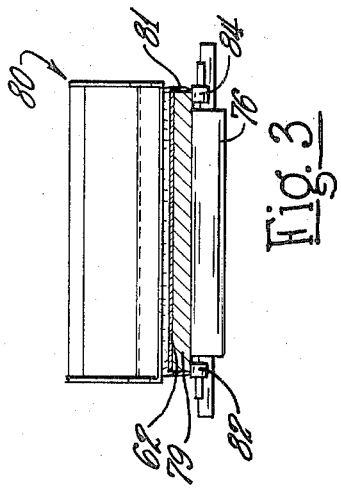

INVENTORS
STUART H. STAPLEFORD &
BY CHARLES E. NUTTER

Staelin & Overman
ATTORNEYS

ROOFING BOARD OF FIBROUS GLASS

This invention relates to a roofing board composed principally of bonded fibrous glass and to such a board primarily intended for roof insulation.

The roofing boards of this invention are designed mainly as one-ply roofing elements for flat or low-pitched roof decks, but may be covered with additional built-up bitumen-bonded roofing material. The boards may be laid directly over various types of decks including those of wood, steel, concrete or precast slabs.

A principal object of the invention is the provision of a roofing board that may be economically and completely fabricated in a continuous production line utilizing a reduced number of components and fewer steps in the manufacturing process.

A concomitant purpose is to provide an insulating board that amplifies the overall strength of a built-up roof structure.

A further object of the invention is a generally air permeated, thermal insulating roofing board that has an upper stratum of extra density and strength with exceptional resistance to compressive and puncturing forces as well as to wrinkling, cracking or oxidation under temperature variations and sun rays.

A further aim is the provision of an insulating roofing element which presents an impermeable upper surface for receiving a mopping of hot bituminous material in contrast to the usual smooth paper surfacing.

Another object of the invention is a roofing board with sufficient rigidity and attachment characteristics to withstand uplifting under high winds from its installed position in a roof structure.

A still further object of this invention is a roofing board that has improved weathering resistance, sufficient strength and stability to serve without additional coatings or plies as a complete, finished roofing structure.

These and other objects and advantages of the invention are attained principally through constructing a roofing board with randomly positioned, individual, non-continuous glass fibers extending in spaced and in resinously bonded relation throughout the full area of the board including an upper stratum thereof, having short bundles or strands of glass fibers in the upper stratum resinously bonded to the non-continuous fibers, and having the upper stratum saturated and further bonded by an asphaltic impregnation, and a comparatively stiff and solid surfacing sheet of blended asphaltic and polymeric materials reinforced with fibrous glass.

The successful practice of the invention is further promoted by supplemental features set forth in the subsequent description and illustrated in the accompanying drawings in which:

FIG. 2 is a diagrammatic side elevation of apparatus comprising a continuation of the production line starting with the apparatus of FIG. 1 and including a conveyor, an asphalt applicator, a surfacing sheet applicator, and other processing devices.

FIG. 3 is a cross section of the apparatus of FIG. 2 taken on the line 3 — 3 thereon and as viewed in the direction of the arrows.

Figure 1:
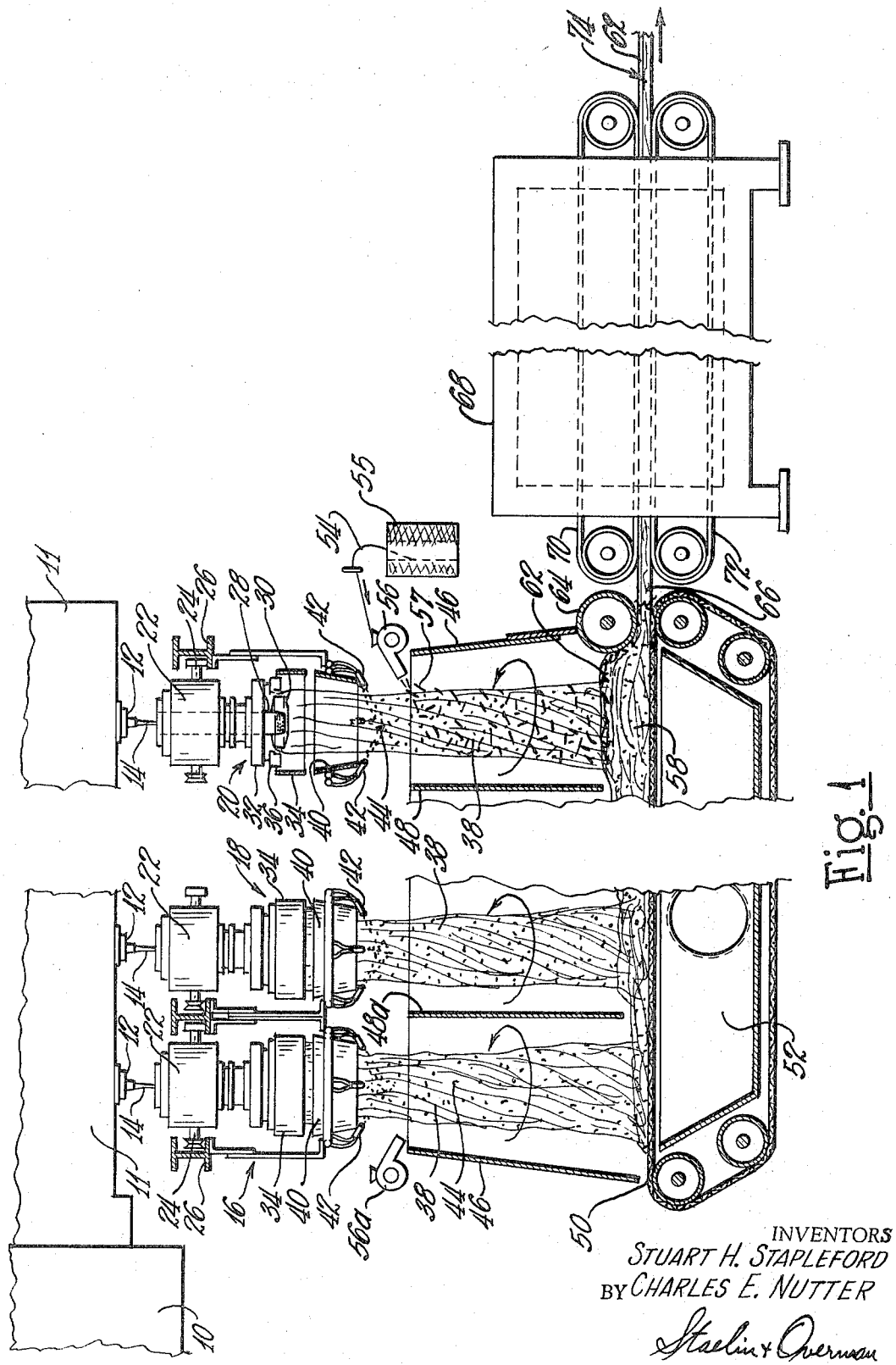
FIG. 1 is a longitudinal, partly sectional, elevational view of a fiber forming and collecting apparatus including a series of rotary type fiber forming units, a fiber collecting conveyor, and compressing conveyor flights passing through a binder curing oven.

Referring in more detail to the drawings, suitable equipment and processing procedure for fabricating the boards are presented in FIGS. 1, 2 and 3 starting with the production line of FIG. 1 which includes a portion of a furnace 10 with a forehearth 11 extending therefrom. A series of ported bushings 12 are mounted upon the lower side of the forehearth 11. Streams 14 of molten glass issue downwardly from the bushings into a series of seven rotary fiber forming units of which three, 16, 18, the first two, and 20, the last of the series, are here illustrated.

The rotary forming units are all alike and of a conventional design including an upper housing 22 supported upon a carriage 24 movably mounted upon tracks 26. This arrangement permits each unit to be temporarily transferred from the hot area of the forehearth for inspection and maintenance requirements.

As may be seen in the sectioned portion of rotary unit 20 the stream 14 of molten glass is directed downwardly through a hollow tube or quill 28 extending from the upper end of housing 22 centrally down to a centrifuge 30 to which it is joined. The quill and centrifuge are rotatably driven by a motor within housing 22. The molten glass is fiberized by being centrifugally forced through orifices in the peripheral surface of the centrifuge 30. From chamber 32 hot combustion gases are discharged down upon the upper surface of the centrifuge 30 to maintain it at molten glass temperature.

The primary fibers issuing laterally from the orificed peripheral surface of the centrifuge 30 are blown downwardly within the cylindrical shield 34 and are further attenuated therein by a blast of combustion gases from the annular burner 36. The resulting whirling veil 38 of fibers with the combined streams of hot gases from chamber 32 and burner 36 descends through guiding spout 40. The fibers may be between twenty-five and sixty hundred thousandths of an inch in diameter but preferably have a diameter of approximately thirty nine hundred thousandths.

A series of nozzles 42 around the lower edge of spout 40 project resinous binder particles 44 into the fibrous veil 38 prior to the entry of the fibers into the forming hood 46. In this instance a vertical partition 48 within the hood secludes the fibers from the last rotary unit 20 in their descent to the foraminous conveyor 50, traveling over suction chamber 52, from the fibers produced by the preceding rotary units. Similarly a partition 48a sequesters the fibers from the first unit 16.

Phenol formaldehyde is the preferred binding agent, but it has been well established that various other resinous materials such as epoxies, urea and melamine formaldehydes also give excellent results. The amount of the binder utilized is advisably in the region of 9 per cent by weight of the full fibrous pack but may be varied within a range roughly of 5 to 15 per cent with the cost factor tending to discourage higher quantities, and diminishing strength accompanying the use of lower amounts.

Chopped strands 57 are mixed with the fibers produced by rotary unit 20 by the combination chopper and blower 56. This draws strands 54 from an alined series of strand packages such as the spool or bobbin 55 and projects the chopped strands into the upper end of the portion of the hood 46 which is confined by partition 48.

The chopped strands 57 are desirably cut to lengths between 2 and 4 inches and in the example of processing herein selected for purposes of explanation amount in weight to at least 10 per cent of the weight of the non-continuous fibers from rotary forming unit 20 with which they are combined. With a conveyor speed of 60 feet per minute and a deposited fibrous pack 4 feet wide intended for forming a roofing board 1 inch in thickness, the chopped strands would be introduced at the rate of roughly 2½ pounds per minute.

The basic strands 54 may be of a size providing about 15,000 yards per pound and be composed of 200 continuous filaments of an approximate diameter of thirty seven hundred thousandths of an inch. Alternately, the individual strands may contain some 400 continuous filaments with a diameter around twenty five hundred thousandths of an inch.

Feeding of the chopped strands may be considerably advanced by bundling them into loose rovings upon the packages 55 and passing the rovings through the chopper 56. Sixty strand ends may, for example, be so gathered together in each roving and six or more of such rovings be fed in spaced relation through the chopper 56, the latter being of appropriate length, such as four feet in this instance, to discharge the chopped strands across the width of the hood 46. Through the whirling and turbulent downward movement of the veil 38 of the fibers and binder particles 44 in the accompanying combustion gases, the chopped strands 57 are thoroughly intermixed with the fibers.

Other forms of strands of filaments in side by side, parallel relation including fibrous glass yarns and cords in short or continuous lengths may be utilized in differing quantities for effective practice of the invention.

The pack 58 accumulated within hood 46 includes the fibers produced by the series of seven rotary fiber forming units. As the fibers from rotary unit 20 are the last to be deposited upon the pack 58 there is formed a distinct upper stratum 62 constituting a definite proportion, in this instance one seventh, of the total thickness of the pack 58, throughout which the chopped strands are exclusively distributed.

If it is desired to have a strengthening stratum on the bottom of the pack 58 in addition to the upper stratum 62 strands are fed to the chopper 56a to project chopped strands into intermingling relation with the fibers downwardly discharged from the first fiberizing rotary unit 16. The fibers from this unit and the chopped strands added thereto are segregated during their descent and deposit upon the conveyor 50 by the partition 48a.

The pack 58 is carried by conveyor 50 under roller 64 and is preliminarily reduced thereby to a compressed state 66 for introduction between upper and lower compression conveyor flights 70 and 72 within oven 68. The thickness of the pack is permanently established by the setting of the binder within the oven. A continuous rigid panel 74 with a cut strand reinforced upper stratum 62 and in the thickness of 1 inch in the instance, is accordingly discharged from the oven.

The density of the panel 74 in its final compressed state should not be below 7½ pounds per cubic foot in order to maintain high compressive strength in the roofing boards and preferably should not exceed 9 pounds for retention of the porosity required for superior thermal insulation.

From the oven 68 of FIG. 1 the panel 74 with its upper stratum 62 reinforced with chopped strands 57 moves along the conveyor line 76 diagrammatically shown in FIG. 2. A vertically reciprocating chopping knife 78 cuts the panel 74 crosswise into individual roofing board units 79. The panel 74 is usually four feet in width, a standard fixed dimension of the roofing boards. According to the timing of operation of the knife 78 the other planar dimension of the boards may be within a broad range but most commonly is either 2, 3 or 4 feet.

Residual heat from the binder curing temperature utilized in the oven is retained in the board units 79 as they pass beneath the asphalt coater 80 to which asphalt in a controlled volume is delivered by pump 86. The desired fluidity of the asphalt passing through the coater is maintained by an associated heater 88. A thin continuous curtain 81 of asphalt flows downwardly from the coater across the upper surface and slightly over the edges of the boards 79 whereby the side edge surfaces are also coated. A small amount of the asphalt is applied to the margins of the bottoms of the boards by rollers 82 and 84 best seen in FIG. 3.

Due to the porosity of the board units the asphalt sinks into the upper stratum 62 thereof and slightly into the surfaces of the opposite side edge portions. The penetration of the asphalt is predetermined by the amount thereof, its controlled fluidity and supplementally by the hardening of the asphalt from the chilling effect of the high water content of the parting agent 108 subsequently discharged upon the boards by a crosswise series of nozzles 106.

Through this controlled entry, the asphalt impregnation is restricted to the full or major portion of the thickness of upper stratum 62 amounting in this example to one seventh of the full thickness of the boards 79. The high porosity and attendant thermal insulating capacity of the main portion of the panel is thus preserved.

The preferred asphalt for impregnation of the upper stratum is a steep asphalt having a softening point between 180° and 190° F. One having a softening point below 170° F is not recommended while asphalts with melting points as high as 250° F would ordinarily give very satisfactory service. In the applicator 80 the asphalt is maintained at the desired fluidity by being heated to between 350° and 410° F and normally at around 375° F.

Between approximately 4 and 7½ ounces of the asphalt is applied to each square foot of surface of the board units 79. The maximum is sufficient to thoroughly saturate the upper stratum 62, with some asphalt in any case retained upon the surface of the units. The rather rough surface of the basic fibrous glass board derived from conveyor flight impression and the fibrous stock cooperates with the surface asphalt for attaching engagement with the surfacing sheet 90 to be next deposited upon the units.

While a steep asphalt is preferably utilized other bituminous materials may serve adequately and the term "asphalt" when appearing herein should be interpreted as possibly containing asphaltenes, tarry substances, petroleum residues, pitches, road oils, albino asphalts, asphalt cut-backs, solutions or dispersions and cracked, straight run or natural asphalts.

In the first portion of the production conveyor line 76 which is indicated by the parenthesis A and where the asphalt is applied the board units 79 travel in abutting relation. In the latter section of the production line, marked by the parenthesis B, movement of the board units has been accelerated to predeterminedly space the units several inches apart.

At the start of the second area of the production line a surfacing sheet 90 from supply roll 92 is pressed down upon the board units by applicator roll 94. This sheet, in this example and preferably, has a thickness of one eighth of an inch but is variously serviceable in thicknesses ranging upwardly from one sixteeneth of an inch. The sheet is sufficiently wide to provide an overhanging portion along one side edge of the board units. Also an overhanging portion 116 along the rear edge of each board unit is derived from the trimming action of the subsequently placed vertically reciprocating knife 114.

The composition of the sheet is principally a blend of steep asphalt and a polymeric resinous elastomer reinforced with fibrous glass. The type of the polymeric material is exemplified by resins of butadiene-styrene, polyurethane, neoprene, elastomeric epoxies, and butadiene-acrylonitrile. The content of the polymeric elastomer is desirably in the range between 5 per cent and 30 per cent of the composition. Within this range the elastomer appears to provide a continuous network of polymeric chains dominating the character of the composition to provide elasticity, strength, increased viscosity, and resistance to cracking, oxidation and other weakening tendencies of ordinary asphalt under weathering conditions.

A brittleness may develop with an amount of the elastomer above the specified range. Also the comparatively high cost of this ingredient together with the fact that its effectiveness is not proportional to the amount involved makes a lesser quantity, such as 10 or 15 per cent of the composition, most feasible.

Another highly important component of the polymeric asphalt sheet of this invention is a reinforcement of fibrous glass. This may be in the form of loose chopped strands or a prebonded mat of single fibers, chopped or continuous strands or a combination thereof. The fibrous glass is in an amount for example, of 4 to 7 grams per square foot may be calenderel or kneaded into the polymeric asphalt sheet while softened under heat in a preliminary stage of its production. The tensile strength of the sheet is greatly increased by the fibrous glass and other toughening qualities such as stability and resistance to rupture improved thereby.

To add to the body of the asphalt polymeric sheet, an insert filler such as china clay may be included in its composition. In some instances there may be a need for an increment of supplemental ingredients such as accelerators, catalysts or antioxidants.

The asphalt is applied to the upper surfaces of the roofing board units 79 at a sufficiently high temperature that the residue remaining upon the surface is soft and tacky when the asphalt polymeric sheet 90 is deposited thereon. A very thorough and intimate attachment of the sheet to the board units is thus secured.

The parting agent 108 applied over the sheet 90 by nozzles 106 forms a porous coating primarily for the purpose of preventing sticking of adjacent boards when the boards are stacked in shipping packages. The parting agent is a heavily pigmented latex composition with a polyvinyl acetate or other resinous base. It may be formulated according to Example 3 of U.S. Pat. No. 3,239,475 modified by an increase of at least 50 and preferably about 100 percent additional water and a reduction of ten per cent in the pigment content. Approximately 3½ grams of the parting agent in a dried state is applied to each square foot of surface of the now completed boards 122.

The comparatively low temperature of the parting agent dispersion and the evaporative action of the water content has a considerable cooling effect on the asphalt impregnant and is a factor in determining the final depth of its penetration. Conversely, the residual heat of the boards 122 and of the asphalt promotes the practically instantaneous setting of the parting agent.

The final hardening of the asphalt impregnant of the base of the ceiling boards 122 is further promoted by the spraying of cooling water from a series of nozzles 110 and high velocity air jets from nozzles 112. The latter serve mainly to drive off and evaporate the water deposited by nozzles 110.

The final step in the production conveyor line 76 is the crosswise severing of the superimposed sheet 90 by the knife 114. This is timed to closely trim the sheet at the forward end of each board 122 and to leave an overhanging extension of the sheet projecting from the rearward end of each board.

Figure 4:
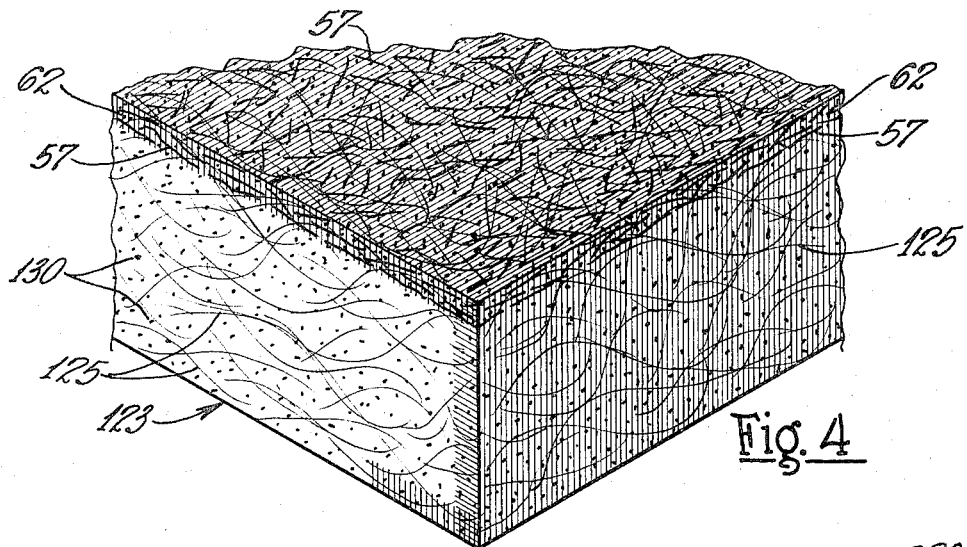
FIG. 4 is a perspective view of a broken corner portion of a roofing board embodying this invention without the surfacing sheet of blended asphaltic and polymeric materials reinforced with fibrous glass.
Figure 5:
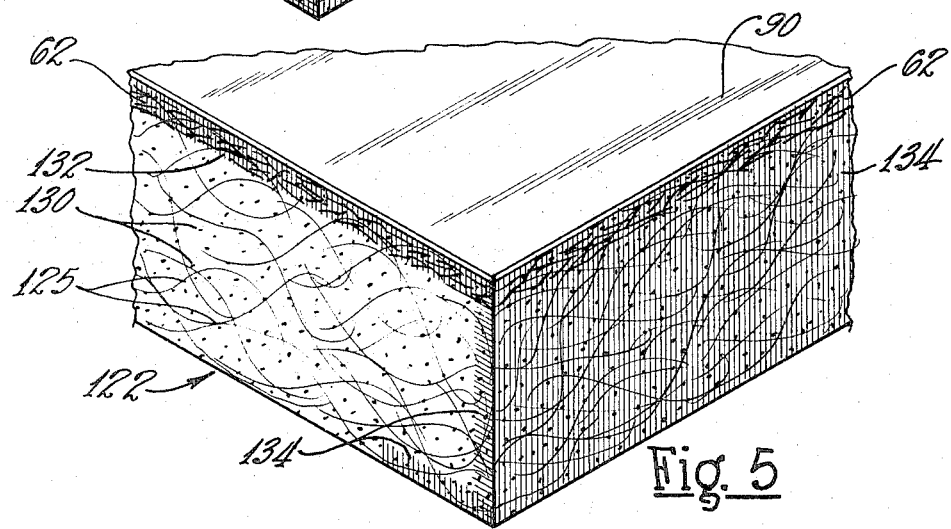
FIG. 5 is a like view of the portion of the roofing board of FIG. 4 with the surfacing sheet attached thereto.
Figure 6:
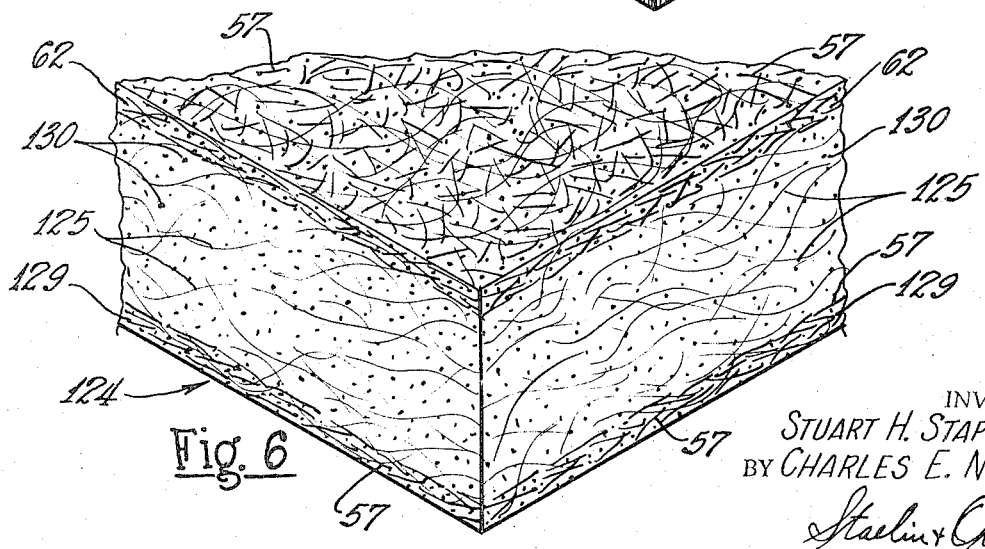
FIG. 6 is a perspective view of a broken corner portion of a roofing board embodying this invention having a narrow reinforced stratum adjacent the lower surface as well as one adjacent the upper surface of the board and is shown without a surfacing sheet.

Corner portions of the roofing boards coming under the invention are depicted in FIGS. 4, 5, and 6. The same basic board is involved in these views but respectively shown are the board without the surfacing sheet 90 of asphalt and elastomer (FIG. 4), with the surfacing sheet 90 (FIG. 5), and with a lower as well as an upper reinforced stratum but without the surfacing sheet and the asphalt impregnation of the upper stratum (FIG. 6).

The non-continuous glass fibers 125 extend throughout the boards in individually spaced relation. Chopped strands 57 of fibrous glass are dispersed throughout the comparatively narrow upper stratum 62 and the lower stratum 129 with the chopped strands uniformly intermingled there with the fibers 125.

Binder particles 130 are spread throughout the boards and secure the fibers 125 together at their crossover points and the chopped strands 57 in the upper and lower strata 62 and 129 to the fibers. There is a slightly higher concentration of the binder particles in the lower portion of the board. This provides this section of the board with added rigidity and strength in relation to the midportion of the board.

The upper stratum 62 is solidified and further strengthened by the impregnation thereof by steep asphalt as shown in FIGS. 4 and 5. An impregnating coating of asphalt is also applied to one side edge suface and a margin of the underside of the boards with only slight penetration. The limiting of asphalt to the upper stratum and the side and marginal underside surfaces leaves the balance of the board with high porosity and accompanying excellent heat insulating capacity.

Figure 7:
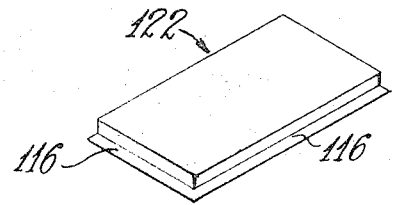
FIG. 7 is a perspective view of a roofing board in inverted position with the surfacing sheet extending outwardly beyond the main body of the board along one side edge and one end edge.
Figure 8:
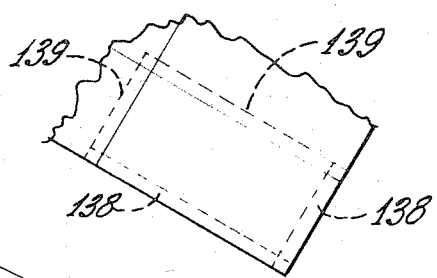
FIG. 8 is a view of the board of FIG. 7 shown in conjunction with portions of adjacent boards with the outward extensions of the surfacing sheet overlapping edges of adjacent boards and reverse overlapping of the sheet extensions of the other boards.

A finished roofing board 122 is illustrated in the perspective view of FIG. 7. It is shown there in inverted position so that the overhanging edges 116 of the surfacing sheet 90 may be better seen. An underside view of an installation of the roofing boards is shown in FIG. 8. Here it may be observed how the extending edges 139 of the surfacing sheet of the board 122 shown in full overlaps the marginal surface portions of adjoining boards, shown in part, and how the upper surface margins along two edges of the board 122 is in turn overlapped by the extending edges 138 of the surfacing sheets of adjacent boards. A prior application of hot asphalt or an asphalt polymeric material adheres the overlapping edge portions of the surfacing sheets. The joints between the boards are thus concealed and sealed.

The tough, rigid, and weathering qualities of these boards provided by the reinforced strata and by the polymeric asphalt, glass reinforced, surfacing sheet make them particularly advantageous for use under abusive and exterior conditions.

Figure 9:
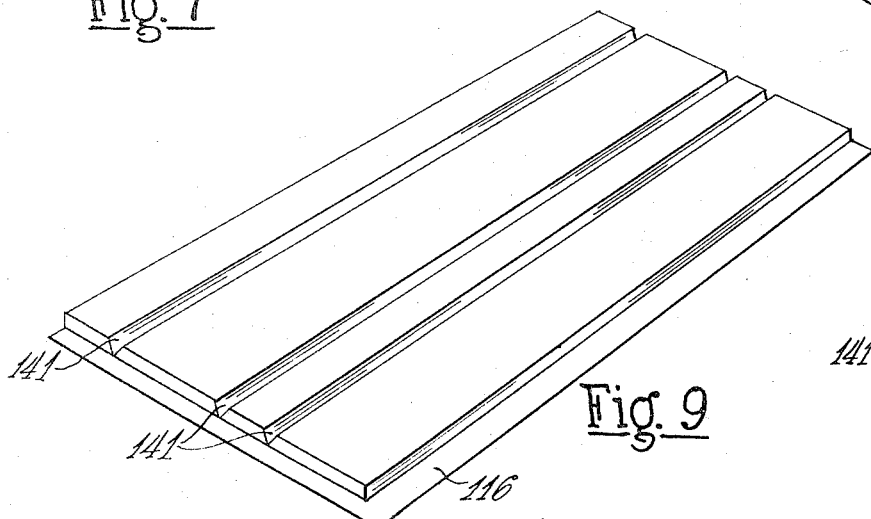
FIG. 9 is a perspective illustration of an insulating board of this invention grooved for folding into a duct.
Figure 10:
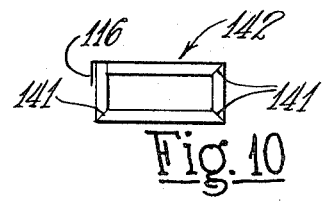
FIG. 10 is an end view of a duct formed from the board of FIG. 9.

A panel adapted for forming a rectangular duct is shown in FIG. 9. This has grooves 141 cut therein along folding lines and outwardly extending edges 116 of the surfacing sheet. A duct 142 made therewith is illustrated in the end view of FIG. 10. It may be noted how the duct may be held to shape by adhesion of the lateral sheet extension 116. In like manner the joints between the duct sections may be sealed by adhering the end extension 116 of each panel over the edge of the adjoining duct.

Figure 11:
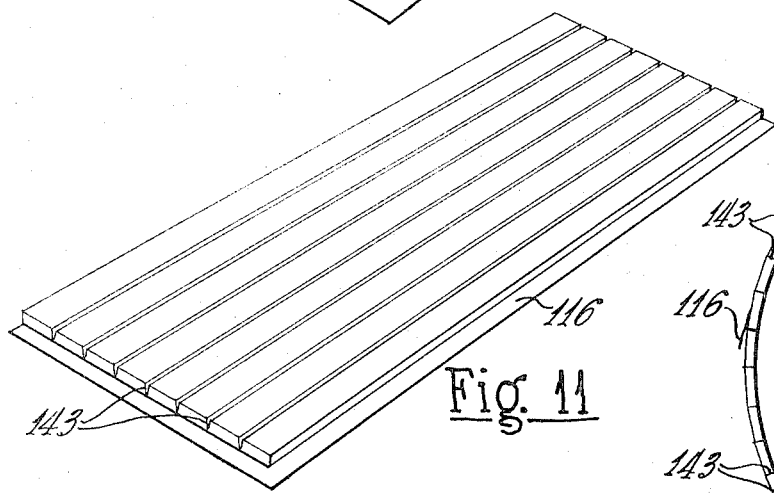
FIG. 11 is a perspective view of an insulating board coming under this invention which is grooved for shaping as an insulating jacket.
Figure 12:
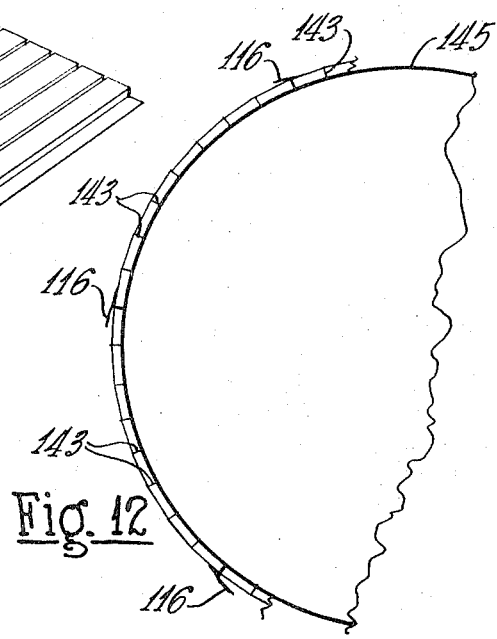
FIG. 12 shows boards such as that of FIG. 11 positioned around a cylindrical tank.

A panel for insulatingly enclosing a tank is depicted in FIG. 11. The notches 143 therein permit curving the panel around the surface of the tank 145 as illustrated in FIG. 12. The sheet extensions 116 are again utilized here in sealing the joints between the panels as well as cooperating with an adhesive coating of asphalt first applied to the tank in holding the panels in place.

In summary, this invention presents primarily a porous, thermal insulating, bonded fibrous glass roofing board having a solid, substantially rigid surfacing sheet which is particularly tough and weather resistant due to its composition of asphalt and a lesser component of polymeric elastomer and a reinforcing element of fibrous glass incorporated therein.

The invention further entails a roofing board the main body of which has at least an upper stratum reinforced with additional fibrous glass and with an impregnation of asphalt.

Another embodiment of the invention comprises a roofing sheet including in its composition asphalt, a polymeric elastomer and a reinforcing fibrous glass element.

As those skilled in the arts involved may perceive, various alterations and modifications may be made in the boards of this invention without departing from the spirit thereof and the scope of the appended claims.

We claim:

1. A porous, generally highly air permeated, thermal insulating, bonded glass roofing board at least one inch in thickness having a preformed, comparatively solid and rigid surfacing sheet attached thereto, said sheet being composed of a blend of asphalt and a polymeric elastomer and being reinforced with fibrous glass embedded therein, and said roofing board having randomly positioned, individual, non-continuous glass fibers extending in spaced and resinously bonded relation throughout the full area of the board beneath the surfacing sheet.

2. A roofing board according to claim 1 in which there is a narrow stratum immediately below the surfacing sheet which is reinforced by short bundles or strands of multiple glass fibers resinously bonded to the non-continuous fibers, the said stratum being further bonded by an asphaltic impregnation.

3. A roofing board according to claim 1 in which the polymeric elastomer is a minor component of the surfacing sheet in an amount between five and thirty per cent by volume.

4. A roofing board according to claim 1 in which the surfacing sheet is between one sixteenth and one eighth of an inch in thickness.

5. A roofing board according to claim 1 in which the surfacing sheet is attached to the roofing board by asphalt.

* * * * *